United States Patent Office 3,352,869
Patented Nov. 14, 1967

3,352,869
SUBSTITUTED AND UNSUBSTITUTED 4-(5H-DI-BENZO[a,d]CYCLOHEPTEN - 5 - YLIDENE) - 1-(AMINO OR NITROSO)PIPERIDINES
Edward L. Engelhardt, Gwynedd Valley, Pa., assignor to Merck & Co., Inc., Rahway, N.J., a corporation of New Jersey
No Drawing. Filed May 18, 1965, Ser. No. 456,852
4 Claims. (Cl. 260—293)

This invention relates to derivatives of piperidine. In particular, the invention relates to piperidine derivatives having the structural formula

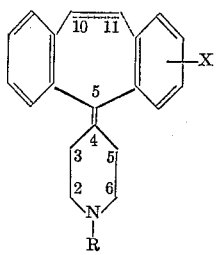

wherein X is selected from the group consisting of hydrogen and halogen and R is selected from the group consisting of nitroso and amino. The dotted line in the above formula indicates that the compounds may be saturated or unsaturated at the designated positions.

Those compounds wherein R is amino can advantageously be employed in pharmaceutical applications because they possess antiserotonin and antihistaminic activity. As antiserotonin or antihistaminic agents, the compounds may be administered orally in the form of tablets, powders, sustained release pellets and the like. Such preparations are made in known manner employing conventional pharmaceutical carriers and excipients. Alternatively, the compounds may be administered orally or parenterally in the form of aqueous solutions or suspensions. These preparations can also be made in known manner employing conventional diluents, stabilizing agents, preservatives and the like. When administered orally or parenterally, satisfactory results are obtained at a daily dosage level of from about 20 mgs. to about 300 mgs., preferably given in divided doses over the day or in sustained release form. The compounds are most conveniently administered in the form of their non-toxic salts, preferably acid addition salts, and such salts are considered to be equivalent to the bases and included within the scope of this invention.

Those compounds wherein R is nitroso are useful as intermediates for the preparation of the above-mentioned amino compounds.

Representative compounds, wherein R is amino in the above structural formula, embraced within the scope of the invention include 4-(5H-dibenzo[a,d]cyclohepten-5-ylidene)-1-aminopiperidine
4-(10,11-dihydro-5H-dibenzo[a,d]cyclohepten-5-ylidene)-1-aminopiperidine
4-(3-bromo-5H-dibenzo[a,d]cyclohepten-5-ylidene)-1-aminopiperidine
4-(3-chloro-10,11-dihydro-5H-dibenzo[a,d]cyclohepten-5-ylidene)-1-aminopiperidine
4-(2-chloro-5H-dibenzo[a,d]cyclohepten-5-ylidene)-1-aminopiperidine
4-(3-fluoro-5H-dibenzo[a,d] cyclohepten-5-ylidene)-1-aminopiperidine Representative compounds, wherein R is nitroso in the above structural formula, included within the scope of the invention, there may be mentioned 4-(5H-dibenzo[a,d]cyclohepten-5-ylidene)-1-nitrosopiperidine
4-(10,11-dihydro-5H-dibenzo[a,d]cyclohepten-5-ylidene)-1-nitrosopiperidine
4-(3-bromo-5H-dibenzo[a,d]cyclohepten-5-ylidene)-1-nitrosopiperidine
4-(3-chloro-10,11-dihydro-5H-dibenzo[a,d]cyclohepten-5-ylidene)-1-nitrosopiperidine
4-(2-chloro-5H-dibenzo[a,d]cyclohepten-5-ylidene)-1-nitrosopiperidine
4-(3-fluoro-5H-dibenzo[a,d]cyclohepten-5-ylidene)-1-nitrosopiperidine The compounds of this invention may be prepared as illustrated by the following reaction sequence

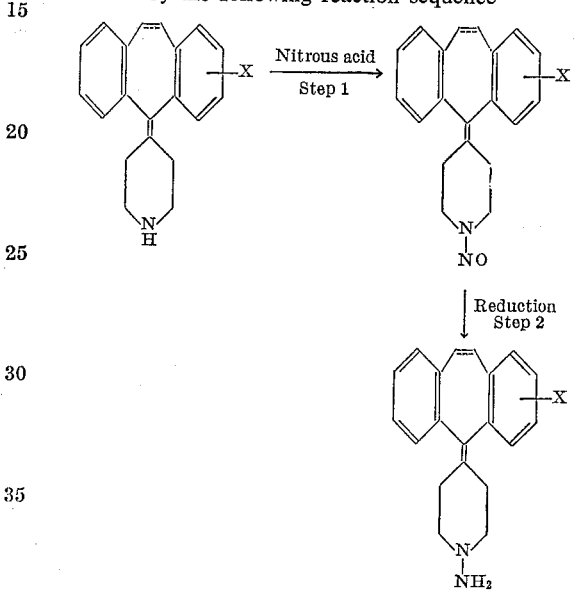

wherein X and the dotted line have the same significance as set forth above.

The first step of the process involves the reaction of the substituted piperidine with nitrous acid at room temperature or elevated temperatures such as are obtained by the use of a steam-bath. The reaction is preferably carried out in an aqueous medium and under slightly acidic conditions. An inorganic nitrite is employed as the source of the nitrous acid. Liberation of the nitrous acid is accomplished by the addition of a strong acid such as hydrochloric acid to the mixture prior to the addition of the nitrite. After addition of the nitrite is completed, the pH of the mixture is adjusted so as to maintain slightly acidic conditions. The desired nitroso derivative is recovered employing conventional techniques.

The second step of the process involves reduction of the nitroso compound. The reduction can be effected by treating the nitroso compound in a suitable inert organic solvent such as tetrahydrofuran with lithium aluminum hydride. The desired amino compound can be readily recovered employing conventional techniques.

The following examples are illustrative of the invention.

*Example 1.—4-(5H-Dibenzo[a,d]cyclohepten-5-ylidene)-1-nitrosopiperidine*

To a suspension of 4-(5H-dibenzo[a,d]cyclohepten-5-ylidene)-piperidine (9.78 g., 0.0358 mole) in 200 ml. of water is added 36 ml. of 1 N hydrochloric acid with stirring, followed by 835 ml. of water. The mixture is heated to 75–80° C. on a steam-bath. A cloudy solution results. A solution of 3.06 g. (0.043 mole) of sodium nitrite in the minimum quantity of water is then added and stirring continued while the temperature is maintained for two hours. Shortly after addition of the nitrate, the pH rises and is adjusted to 6.4–6.8 by addition of 6 ml. of 1 N hydrochloric acid. The pH then remains constant. At the end of the heating period, the mixture is cooled to 10° C. and the white precipitate collected. The yield of product, M.P. 176–178° C., is 8.11 g., 75%. Recrystallization from isopropyl alcohol raises the M.P. to 179—180° C.

*Example 2*

Following the procedure of Example 1, the products enumerated below are obtained employing the piperidine derivatives designated below in place of the 4-(5H-dibenzo[a,d]cyclohepten-5-ylidene)-piperidine used in Example 1.

| Piperidine | Product |
| --- | --- |
| 4-(10,11-dihydro-5H-dibenzo-[a,d] cyclohepten-5-ylidene)-piperidine. | 4-(10,11-dihydro-5H-dibenzo-[a,d] cyclopheten-5-ylidene)-1-nitrosopiperidine. |
| 4-(3-chloro-5H-dibenzo[a,d]-cyclohepten-5-ylidene)-piperidine. | 4-(3-chloro-5H-dibenzo[a,d]-cyclohepten-5-ylidene)-1-nitrosopiperidine. |
| 4-(2-chloro-5H-dibenzo[a,d]-cyclohepten-5-ylidene)-piperidine. | 4-(2-chloro-5H-dibenzo[a,d]-cyclohepten-5-ylidene)-1-nitrosopiperidine. |
| 4-(3-bromo-5H-dibenzo[a,d]-cyclohepten-5-ylidene)-piperidine. | 4-(3-bromo-5H-dibenzo[a,d]-cyclohepten-5-ylidene)-1-nitrosopiperidine. |
| 4-(3-fluoro-5H-dibenzo[a,d]-cyclohepten-5-ylidene)-piperidine. | 4-(3-fluoro-5H-dibenzo[a,d]-cyclohepten-5-ylidene)-1-nitrosopiperidine. |

*Example 3.—4-(5H-Dibenzo[a,d]cyclohepten-5-ylidene)-1-aminopiperidine hydrogen maleate*

A. *Preparation of 4 - (5H-Dibenzo[a,d]cyclohepten-5-ylidene) - 1 - aminopiperidine.*—4 - (5H - Dibenzo[a,d] cyclohepten-5-ylidene)-1-nitrosopiperidine (4.83 g., 0.016 mole) is dissolved in 25 ml. of tetrahydrofuran. This solution is stirred in an atmosphere of nitrogen while an excess of a 1 M solution of lithium aluminum hydride in tetrahydrofuran is added gradually. When the addition is complete, the mixture is stirred for an hour at room temperature and a solution of water in tetrahydrofuran is added to decompose the excess hydride. Ether is added and the mixture is filtered. After washing the filter cake with ether, the combined filtrate and washings are dried over sodium sulfate and the solvent distilled in a nitrogen atmosphere, leaving 4 - (5H-dibenzo[a,d]cyclohepten-5-ylidene)-1-aminopiperidine as a pale yellow oily residue.

B. The hydrogen maleate is prepared by dissolving the base in absolute alcohol and adding a small excess of maleic acid dissolved in alcohol. After repeated recrystallizations from mixtures of absolute alcohol and ether, the product melts at 143–144° C. with decomposition (sinters at 142° C.).

*Analysis.*—Calc'd. for $C_{20}H_{20}N_2 \cdot C_4H_4O_4$: C, 71.27; H, 5.98; N, 6.93. Found: C, 71.00; H, 6.04; N, 7.09.

*Example 4*

Following the procedure of Example 3A., the products enumerated below are obtained employing the nitrosopiperidines designated below in place of the 4-(5H-dibenzo[a,d]cyclohepten-5-ylidene)-1-nitrosopiperidine used in Example 3.

| Nitrosopiperidine | Product |
| --- | --- |
| 4-(10,11-dihydro-5H-dibenzo-[a,d]-cyclohepten-5-ylidene)-1-nitrosopiperidine. | 4-(10,11-dihydro-5H-dibenzo-[a,d]-cyclopheten-5-ylidene)-1-aminopiperidine. |
| 4-(3-chloro-5H-dibenzo[a,d]-cyclohepten-5-ylidene)-1-nitrosopiperidine. | 4-(3-chloro-5H-dibenzo[a,d]-cyclohepten-5-ylidene)-1-aminopiperidine. |
| 4-(2-chloro-5H-dibenzo[a,d]-cyclohepten-5-ylidene)-1-nitrosopiperidine. | 4-(2-chloro-5H-dibenzo[a,d]-cyclohepten-5-ylidene)-1-aminopiperidine. |
| 4-(3-bromo-5H-dibenzo[a,d]-cyclohepten-5-ylidene)-1-nitrosopiperidine. | 4-(3-bromo-5H-dibenzo[a,d]-cyclohepten-5-ylidene)-1-aminopiperidine. |
| 4-(3-fluoro-5H-dibenzo[a,d]-cyclohepten-5-ylidene)-1-nitrosopiperidine. | 4-(3-fluoro-5H-dibenzo[a,d]-cyclohepten-5-ylidene)-1-aminopiperidine. |

What is claimed is:

1. A compound selected from the group consisting of compounds of the structural formulas

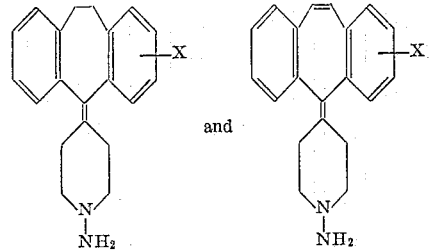

and non-toxic salts thereof, wherein X is selected from the group consisting of hydrogen and halogen.

2. A compound selected from the group consisting of compounds of the structural formulas

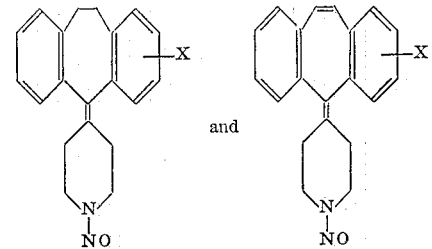

wherein X is selected from the group consisting of hydrogen and halogen.

3. 4-(5H-dibenzo[a,d]cyclohepten-5-ylidene)-1-aminopiperidine.

4. 4-(5H-dibenzo[a,d]cyclohepten-5-ylidene)-1-nitrosopiperidine.

References Cited

UNITED STATES PATENTS

| 3,014,911 | 12/1961 | Engelhardt | 260—293 |
| 3,128,276 | 4/1964 | Rorig | 260—293.2 |
| 3,182,086 | 5/1965 | Levering et al. | 260—293.2 |
| 3,317,607 | 5/1967 | Latourette | 260—293.2 |

WALTER A. MODANCE, *Primary Examiner.*

A. D. SPEVACK, *Assistant Examiner.*